UNITED STATES PATENT OFFICE.

EDWARD WATSON, OF GRAND RAPIDS, MICHIGAN.

PROCESS OF MAKING INK.

SPECIFICATION forming part of Letters Patent No. 458,741, dated September 1, 1891.

Application filed November 10, 1890. Serial No. 370,953. (Specimens.)

*To all whom it may concern:*

Be it known that I, EDWARD WATSON, residing at Grand Rapids, in the county of Kent and State of Michigan, have invented a new and useful Composition of Matter, of which the following is a specification.

My invention relates to a composition of matter to be used especially as an ink for drawing, marking, and for blacking the surface of leather or rubber, consisting, essentially, of water, an alkali, and the portion of coal-tar which is insoluble in sulphuric acid, and has many useful applications, such as an ink for marking, drawing, stamping, and as a blacking and polish for leather, rubber, &c.; is also useful as a stain for wood, especially for shingles, as it is highly antiseptic and prevents the deposit of mold. It is also a valuable coating to protect the surface of iron or steel from rust, &c.

To carry out my invention I take about equal portions of coal-tar and sulphuric acid and mix them by stirring for several minutes. If the temperature increases much, the result will not be a success. Either small quantities must be mixed or some provision be made to keep the temperature between 100° and 200° Fahrenheit. Under such circumstances, if the tar and acid are as free as possible from water, the tar will usually be decomposed in a few minutes. If from any reason the decomposition has not been effected by the above process, then the mixture may be allowed to rest several days, which will accomplish the result. The quantity of acid must be large to fully effect the decomposition of the tar. To know when the desired result has been effected I am guided by the strong fumes of sulphurous-acid gas arising from the mixture.

Another test consists of taking a small portion of the mixture and rubbing it between the thumb and finger in cold water. If it is easily pulverized, then the action has been complete; but if it remains a greasy pasty mass, then the decomposition has not been carried far enough, and an alkaline solution cannot be made, as claimed. After being satisfied that the decomposition of the tar has been effected the mass of tar and acid should be placed in cold water, and when it cools it may be crushed and the washing continued by repeatedly changing the water after the sediment has fully subsided until the soluble portion of the tar, together with the free acid, has been removed, after which I add to the black sediment an alkali until it is decidedly alkaline and warm the mixture to about 100° Fahrenheit, when a solution will be effected which may be made of any desired consistency by the addition or removal of water. In practice I generally use ammonia as an alkali, because it is volatile and leaves an insoluble water-proof coating when dry. For many purposes other alkaline substances or alkaline salts may be used.

The essential point in this invention lies in the fact that I first treat the tar by sulphuric acid and then remove by washing with water the soluble portion of the tar, together with the free acid, and then dissolve the insoluble portion of the tar by an alkali.

What I claim is—

In the manufacture of ink, the process which consists in thoroughly mixing coal-tar and sulphuric acid in about equal parts and at a temperature of not over 200° Fahrenheit, and then washing out the acid and mixing with dilute alkali to the required consistency, substantially as specified.

EDWARD WATSON.

Witnesses:
J. J. EMERY,
ALFRED WOLCOTT.